United States Patent [19]

Trezeguet et al.

[11] 4,388,800
[45] Jun. 21, 1983

[54] METHOD OF MANUFACTURING AN OPTICAL FIBRE CABLE

[75] Inventors: Jean-Pierre Trezeguet; Jean-Patrick Vives, both of Calais, France

[73] Assignee: Societe Anonyme dite: Les Cables de Lyon, Clichy, France

[21] Appl. No.: 337,891

[22] Filed: Jan. 7, 1982

[30] Foreign Application Priority Data

Jan. 9, 1981 [FR] France ............... 81 00281

[51] Int. Cl.³ ............... D02G 3/36; G02B 5/16
[52] U.S. Cl. ............... 57/7; 57/13; 65/2; 65/4.2; 350/96.23
[58] Field of Search ............... 333/239, 242; 350/96.23; 57/3, 7, 13; 65/2, 4.2

[56] References Cited

U.S. PATENT DOCUMENTS 3,498,286 3/1970 Polanyi et al. ............... 350/96.23 X
4,241,979 12/1980 Gagen et al. ............... 350/96.23

FOREIGN PATENT DOCUMENTS 2709106 7/1978 Fed. Rep. of Germany .
2519050 9/1978 Fed. Rep. of Germany .
2052092 1/1971 United Kingdom .

*Primary Examiner*—Robert L. Lindsay, Jr.
*Attorney, Agent, or Firm*—Sughrue, Mion, Zinn, Macpeak and Seas

[57] ABSTRACT

An optical fibre cable comprises a support structure having helical grooves around its periphery. Optical fibres are laid in the grooves. Said fibre-containing grooves (2) are then partially untwisted in the direction of the arrow (4), thereby lengthening the pitch of the grooves and hence lengthening the fibres relative to the grooves.

3 Claims, 2 Drawing Figures

METHOD OF MANUFACTURING AN OPTICAL FIBRE CABLE

The present invention relates to optical fibre cables.

BACKGROUND OF THE INVENTION

In such cables, the optical fibres are associated with a generally cylindrical elongate support structure which bears tractive forces. The support structure is generally made of metal or of a plastics substance such as polyethylene which may optionally be reinforced with a central steel wire. The support structure has helical grooves around its periphery, which may be of constant-pitch or of periodically-reversing pitch and the fibres are deposited in the grooves. The cross-section of the grooves is larger than that of the fibres to allow them the possibility of some play and the space left free in the grooves being filled with a viscous compound. These grooves serve to even out the stresses exerted on the fibres during the fibre winding operations, and during use of the resulting cable.

The assembly formed by the support structure and by the optical fibres is covered with a fibre-protecting sheath and with an outer sheath, together with optional mechanical reinforcement and, if need be, with one or more intermediate layers of substance which acts as a shock absorber and as a protection against radial compression forces.

The mobility of the fibres in the grooves is satisfactory for bending stresses but not satisfactory for tractive stresses which elongate the support structure, in particular when these stresses are close to the breaking point of the support structure or when they are due to large amplitude thermal cycling.

Preferred embodiments of the present invention provide optical fibres whose length is sufficiently longer than the grooves of the support structure for the tractive forces not to be transmitted to them as long as the support structure does not reach its breaking elongation limit.

SUMMARY OF THE INVENTION

The present invention provides a method of manufacturing an optical fibre cable comprising a generally cylindrical elongate central support structure with helical grooves formed around its periphery to accommodate optical fibres, wherein the method consists in laying fibres in said grooves and in then partially untwisting the fibre-containing grooves, thereby lengthening the pitch of the grooves and hence increasing the length of the optical fibres relative to the length of the grooves.

BRIEF DESCRIPTION OF THE DRAWING

An Implementation of the invention is described with reference to FIGS. 1 and 2 in the accompanying drawing in which the fibres are assembled before and after application of the method.

MORE DETAILED DESCRIPTION

Figure 1:
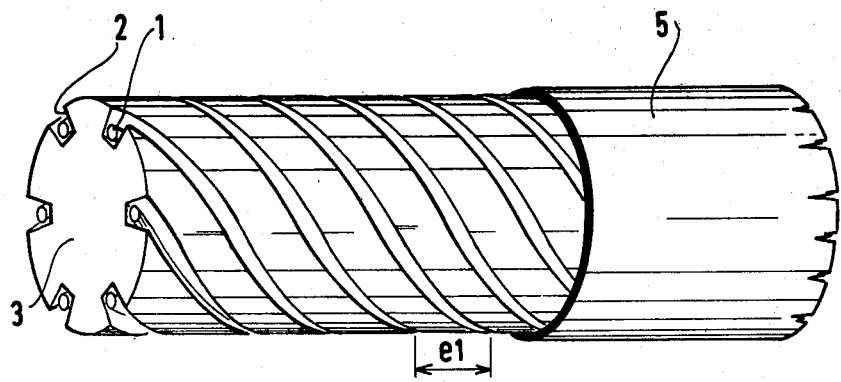

In FIG. 1, the optical fibres 1 are disposed in the bottoms of the helical grooves 2 formed around the periphery of a central support structure 3 which is preferably made of aluminium or of a plastics substance. It may be reinforced by a central steel wire, not shown, The assembly thus formed is coated with a sheath 5 or with a tape winding to protect and support the fibres.

Figure 2:
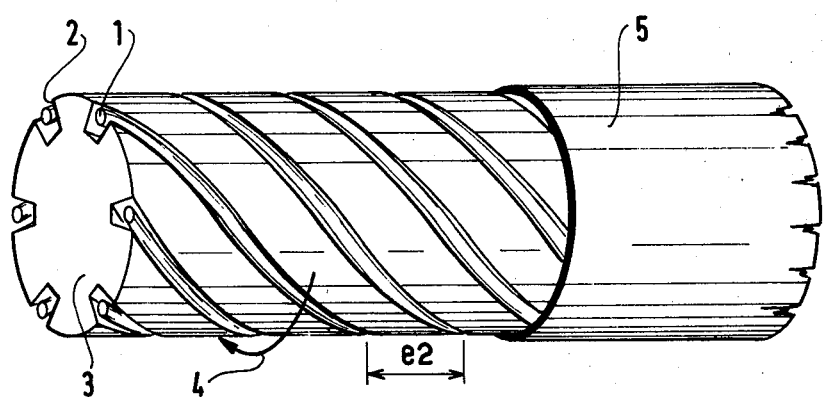

As illustrated in FIG. 2, extra length is imparted to the fibres 1 by untwisting the grooves in the direction shown by the arrow 4. The fibres then snake along the grooves or lie slack therein.

In the case where the support is not very resilient, e.g. is made of aluminium the grooves are untwisted simply by twisting the support structure in the opposite direction to the twist of the grooves. In the contrary case, i.e. the support-structure is resilient, the support structure is twisted (without going beyond its elastic limit) in the same direction of twist as the grooves before the fibres are laid therein. The grooves are then "untwisted" by allowing the support structure to return elastically to its original pitch after the fibres have been laid. In both cases, the pitch of the fibre-containing grooves is lengthened, thereby changing the spacing between the grooves from that referenced $e_1$ in FIG. 1 to that referenced $e_2$ in FIG. 2, thus imparting the required extra length to the fibres relative to the grooves.

We claim:

1. A method of manufacturing an optical fibre cable comprising a generally cylindrical elongate central support structure with helical grooves formed about its periphery to accommodate optical fibres, the improvement wherein said method consists in laying fibres whose cross-section is larger than the cross-section of the grooves in said grooves, providing a cover about the periphery of said central support structure to protect the fibres against radial compression forces, and in then partially untwisting the fibre-containing grooves, thereby lengthening the pitch of the grooves and hence increasing the length of the optical fibres relative to the length of the grooves to improve the mobility of the fibres in the grooves to provide an assembly which permits tractive stresses which elongate the support structure, thereby providing optical fibres whose length is sufficiently longer than the grooves than that of the support structure so that the tractive forces are not transmitted to the fibres as long as said support structure does not reach its breaking elongate limit.

2. A method according to claim 1, wherein the support structure is made of a plastically deformable material and wherein the fibre-containing grooves are partially untwisted by twisting the support structure in the opposite direction to the direction of twist of the grooves, said twisting taking place after the fibres have been laid in the grooves and being performed to an extent sufficient to cause plastic deformation of the support structure.

3. A method according to claim 1, wherein the support structure is made of an elastically deformable material and wherein the support structure is elastically twisted in the same direction as the direction of twist of the grooves before the fibres are laid in the grooves, and the fibres are then laid in the grooves while the support structure is maintained in an elastically twisted state, the fibre-containing grooves being subsequently partially untwisted by releasing the support structure to return to its initial degree of twist.

* * * * *